(12) United States Patent
Ting et al.

(10) Patent No.: US 7,607,813 B1
(45) Date of Patent: Oct. 27, 2009

(54) BACKLIGHT MODULE

(75) Inventors: Ching-Hua Ting, Suzhou Industrial Park (CN); Lung-Shiang Luh, Suzhou Industrial Park (CN)

(73) Assignee: Core-Flex Optical (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 12/261,440

(22) Filed: Oct. 30, 2008

(30) Foreign Application Priority Data

Jul. 14, 2008 (TW) ................ 97126700 A

(51) Int. Cl.
*F21V 7/04* (2006.01)
(52) U.S. Cl. .............. 362/607; 362/330; 362/606; 349/64; 349/65; 359/599
(58) Field of Classification Search .......... 349/64, 349/65; 359/599; 362/330, 606, 607, 617–620
See application file for complete search history.

(56) References Cited

U.S. PATENT DOCUMENTS

| 4,373,282 | A | * | 2/1983 | Wragg ................. 40/546 |
| 6,846,098 | B2 | * | 1/2005 | Bourdelais et al. ......... 362/330 |
| 2008/0130118 | A1 | * | 6/2008 | Hsu et al. ............... 359/599 |

* cited by examiner

*Primary Examiner*—Stephen F Husar
(74) *Attorney, Agent, or Firm*—Chun-Ming Shih

(57) ABSTRACT

A backlight module includes a light source and an integrated optical film. The integrated optical film includes a base, a brightness enhancement layer and a diffusion layer. The base has a first surface and a second surface opposite to each other. The brightness enhancement layer has a plurality of brightness enhancement columns and a plurality of diffusion particles. The brightness enhancement columns are disposed on the first surface. The diffusion particles are dispersed in the brightness enhancement columns. The diffusion layer has a plurality of granular patterns disposed on the second surface in an irregular arrangement. Light beams emitted from the light source pass through the diffusion layer, the base and the brightness enhancement layer in proper order.

16 Claims, 6 Drawing Sheets

BACKLIGHT MODULE

BACKGROUND

1. Technical Field

The present invention generally relates to a backlight module and, more particularly to a backlight module having an integrated optical film.

2. Description of the Related Art

FIG. 1 is a schematic side view of a conventional backlight module. Referring to FIG. 1, the backlight module 100 includes a light source 110, a diffusion plate 120, a first diffusion film 130 and a second diffusion film 140. The light source 110 includes a box 112 and a plurality of light tubes 114 disposed in the box 112. The diffusion plate 120 is disposed on the light source 110. The first diffusion film 130 and the second diffusion film 140 are disposed on the diffusion plate 120 in proper order. The brightness of the backlight module 100 generally is low and about 9528 candelas per square meter ($cd/m^2$).

In order to overcome the above-mentioned problem of insufficient brightness, several improving methods are provided as described below. FIG. 2 is a schematic side view of another conventional backlight module. Referring to FIG. 2, the difference between a backlight module 200 and the backlight module 100 is that the backlight module 200 further includes a third diffusion film 250. The brightness of the backlight module 200 is about 9687 $cd/m^2$. However, the brightness of the backlight module 200 is still not sufficient enough. FIG. 3 is a schematic side view of another conventional backlight module. Referring to FIG. 3, the difference between a backlight module 300 and the backlight module 100 is that the backlight module 300 is equipped with two pieces of microlens films 310 and 320 instead of the first diffusion film 130 and the second diffusion film 140 of the backlight module 100. The brightness of the backlight module 300 is about 9736 $cd/m^2$. However, the brightness of the backlight module 300 is still insufficient.

FIG. 4 is a schematic side view of another conventional backlight module. Referring to FIG. 4, the difference between a backlight module 400 and the backlight module 100 is that a prism sheet 450 is disposed between a first diffusion film 430 and a second diffusion film 440. Accordingly, the brightness of the backlight module 400 is effectively improved. However, the number and kind of elements of the backlight module 400 are excessive such that the cost of assembling the backlight module 400 is high.

BRIEF SUMMARY

The present invention is directed to provide a backlight module having an integrated optical film which improves the brightness of the backlight module. In addition, the cost of assembling the backlight module is relatively low.

Other advantages and objects of the present invention can be further comprehended through the technical features disclosed in the present invention.

In order to achieve one or part of or all the objectives or other objectives, an integrated optical film in accordance with an embodiment of the present invention is provided. The integrated optical film includes a base, a brightness enhancement layer and a diffusion layer. The base has a first surface and a second surface opposite to each other. The brightness enhancement layer has a plurality of brightness enhancement columns and a plurality of diffusion particles. The brightness enhancement columns are disposed on the first surface and the diffusion particles are dispersed in the brightness enhancement columns. The diffusion layer has a plurality of granular patterns disposed on the second surface in an irregular arrangement.

In order to achieve one or part of or all the objectives or other objectives, a backlight module in accordance with another embodiment of the present invention is provided. The backlight module includes a light source, a diffusion plate and the integrated optical film. The diffusion plate is disposed on the light source and has a light incident surface and a light emitting surface opposite to the light incident surface. The light incident surface faces the light source. The integrated optical film is disposed on the diffusion plate. The second surface of the base of the integrated optical film faces the light emitting surface.

In order to achieve one or part of or all the objectives or other objectives, another backlight module in accordance with another embodiment of the present invention is provided. The backlight module includes a light guiding plate (LGP), a light source, a diffusion film and the integrated optical film. The light guiding plate has a light incident surface, a bottom surface and a light emitting surface. The light incident surface connects the bottom surface and the light emitting surface. The bottom surface and the light emitting surface are opposite to each other. The light source is disposed adjacent to the light incident surface. The diffusion film is disposed on the light emitting surface. The integrated optical film is disposed on the diffusion film. The second surface of the base of the integrated optical film faces the diffusion film and the light guiding plate.

Since each of the backlight modules in accordance with the above-described embodiments uses the integrated optical film, compared with the prior art, the brightness of each of the backlight modules in accordance with the above-described embodiments is relatively high. Furthermore, the amount of elements of each of the backlight modules in accordance with the above-described embodiments is less such that the cost of assembling each of the backlight modules in accordance with the above-described embodiments is relatively low.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Figure 1:
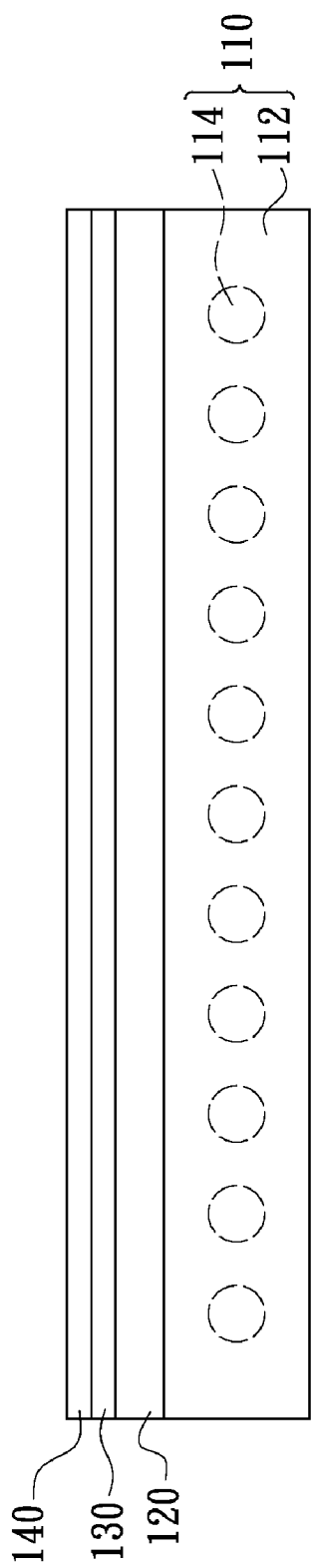
FIG. 1 is a schematic side view of a conventional backlight module.
Figure 2:
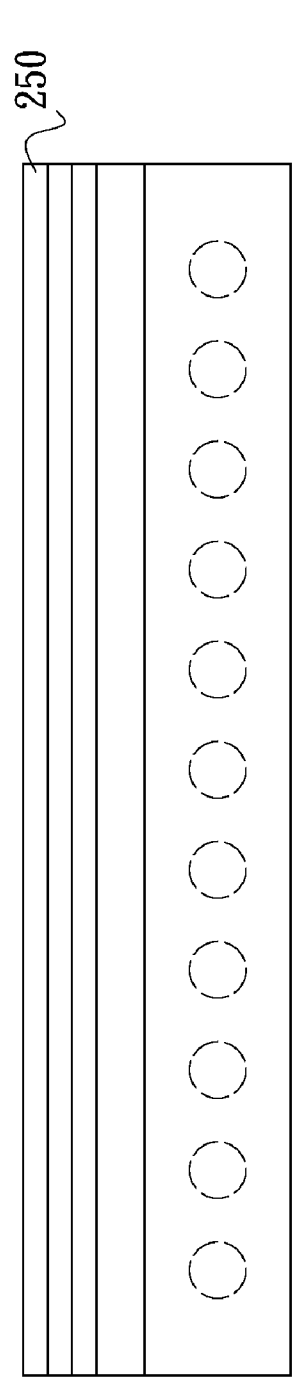
FIG. 2 is a schematic side view of another conventional backlight module.
Figure 3:
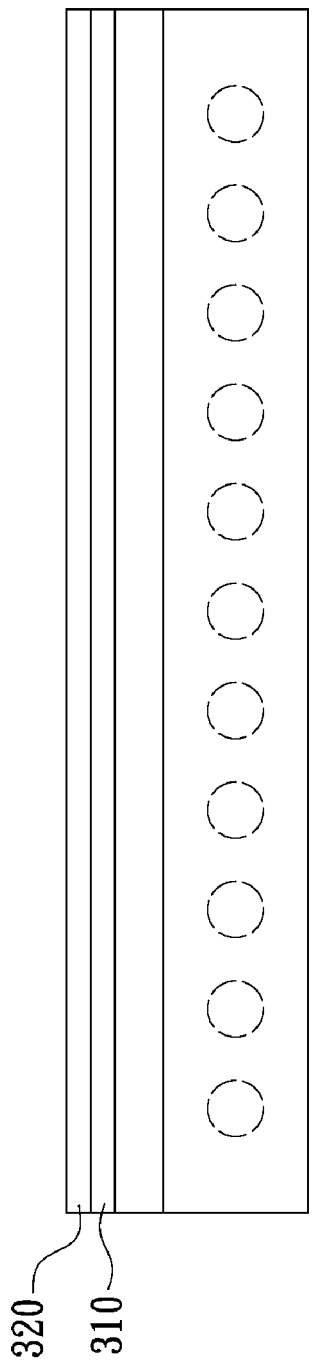
FIG. 3 is a schematic side view of another conventional backlight module.
Figure 4:
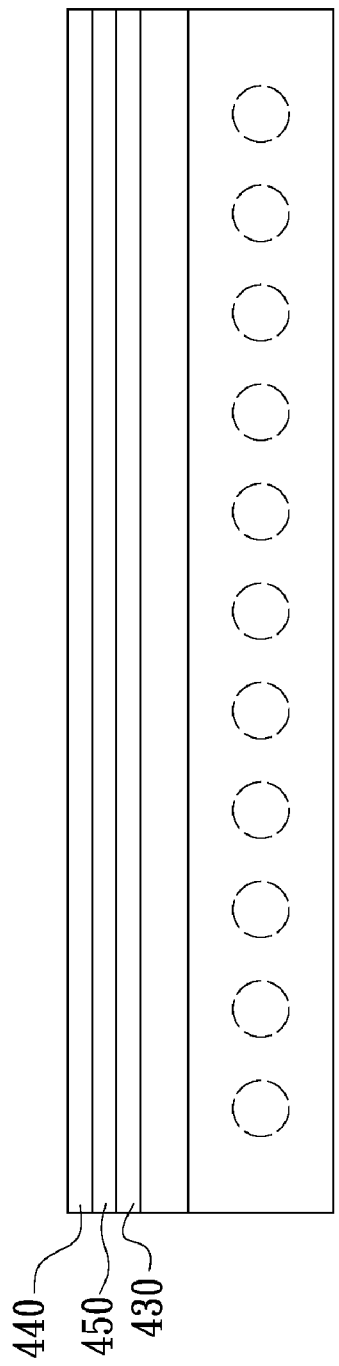
FIG. 4 is a schematic side view of another conventional backlight module.
Figure 5A:
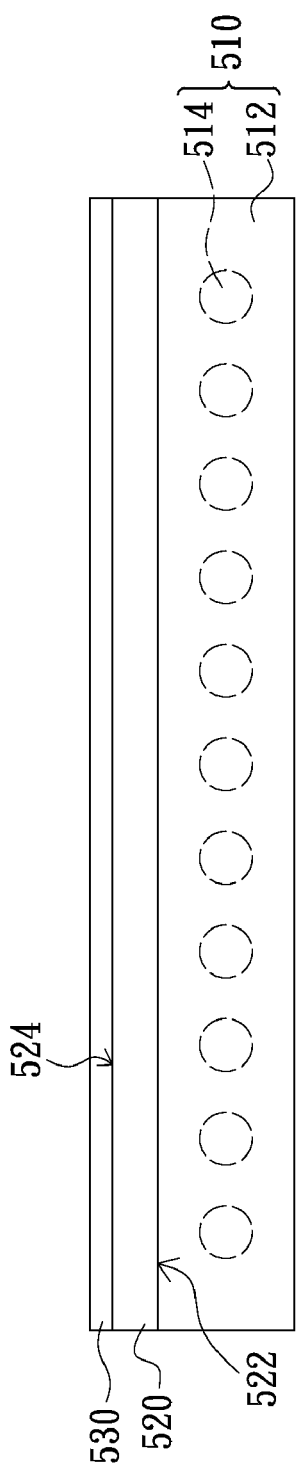
FIG. 5A is a schematic side view of a backlight module in accordance with a first embodiment of the present invention.

FIG. 5A is a schematic side view of a backlight module in accordance with a first embodiment of the present invention. Referring to FIG. 5A, a backlight module 500 in accordance with a first embodiment includes a light source 510, a diffusion plate 520 and an integrated optical film 530. The light source 510 includes a box 512 and a plurality of light tubes 514 disposed in the box 512. The diffusion plate 520 is disposed on the light source 510 and has a light incident surface 522 and a light emitting surface 524 opposite to the light incident surface 522. The light incident surface 522 faces the light source 510.

Figure 5B:
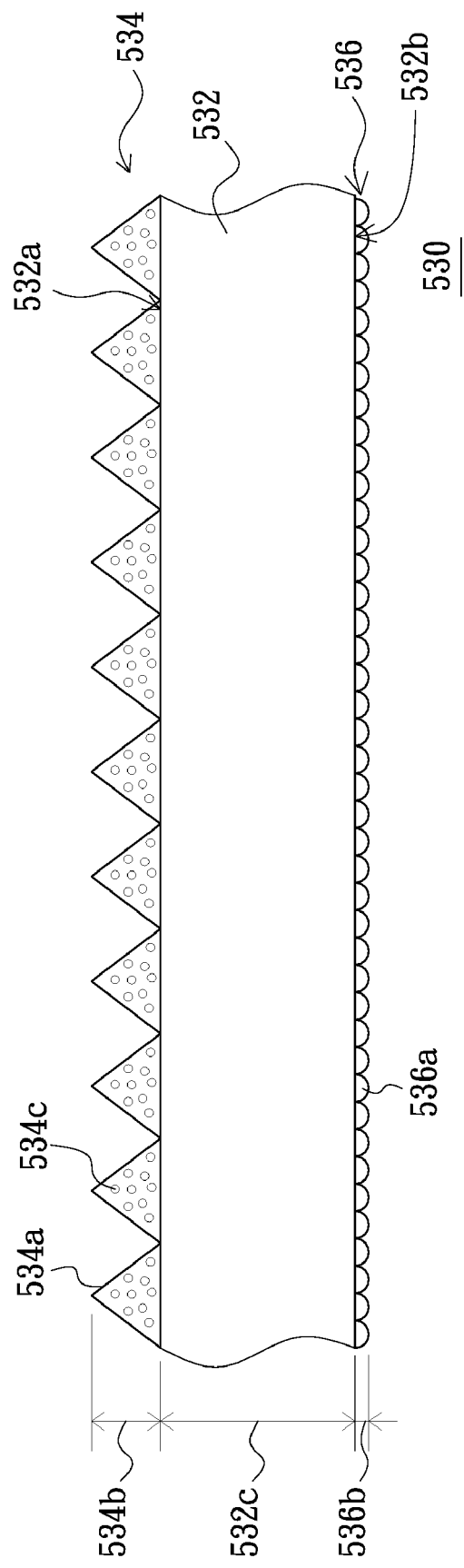
FIG. 5B is a schematic partial enlarged view of the integrated optical film of FIG. 5A.
Figure 6A:
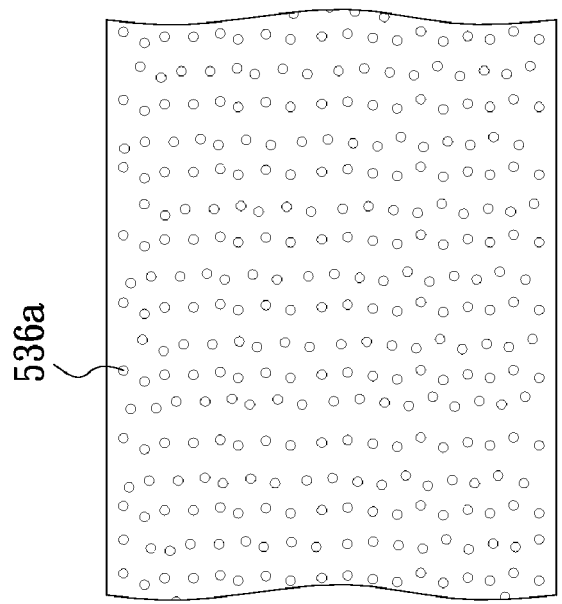
FIG. 6A is a schematic top view of the integrated optical film of FIG. 5A.
Figure 6B:
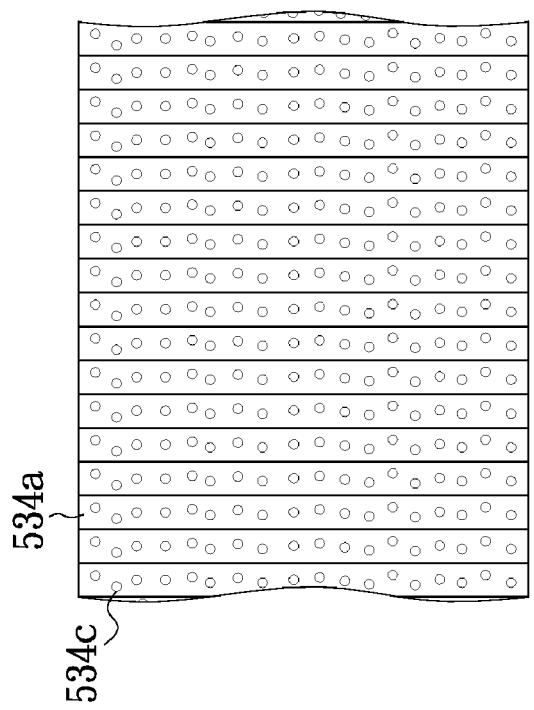
FIG. 6B is a schematic bottom view of the integrated optical film of FIG. 5A.

FIG. 5B is a schematic partial enlarged view of the integrated optical film of FIG. 5A. FIG. 6A is a schematic top view of the integrated optical film of FIG. 5A. FIG. 6B is a schematic bottom view of the integrated optical film of FIG. 5A. Referring to FIGS. 5A, 5B, 6A and 6B, the integrated optical film 530 is disposed on the diffusion plate 520. The integrated optical film 530 includes a base 532, a brightness enhancement layer 534 and a diffusion layer 536. The base 532 has a first surface 532a and a second surface 532b opposite to each other. The second surface 532b of the base 532 faces the light emitting surface 524 of the diffusion plate 520. In the illustrated embodiment, the thickness 532c of the base 532 is in the range from 250 micrometers to 350 micrometers and the base 532 is composed of polyethylene terephthalate (PET).

The brightness enhancement layer 534 has a plurality of brightness enhancement columns 534a. Each of the brightness enhancement columns 534a is, for example, a prism. The brightness enhancement columns 534a are disposed on the first surface 532a of the base 532. In the illustrated embodiment, the thickness 534b of the brightness enhancement layer 534 is less than 40 micrometers and each of the brightness enhancement columns 534a is composed of acrylic resin. Furthermore, the brightness enhancement layer 534 further includes a plurality of diffusion particles 534c according to a requirement of a designer. The diffusion particles 534c are dispersed in the brightness enhancement columns 534a. Each of the diffusion particles 534c is composed of polymethylmethacrylate (PMMA), polycarbonate (PC), polystyrene (PS) or silicon dioxide ($SiO_2$). It is indicated herein that a refractive index of each of the diffusion particles 534c is different from that of each of the brightness enhancement columns 534a.

An approach for the formation of the brightness enhancement layer 534 will be described below. Firstly, a brightness enhancement material layer (not shown) is formed on the first surface 532a of the base 532. Next, a patterning process and a curing process are applied to the brightness enhancement material layer so as to form the brightness enhancement columns 534a.

The diffusion layer 536 has a plurality of granular patterns 536a which are, for example, a plurality of granular protrusions. The granular patterns 536a are disposed on the second surface 532b of the base 532 in an irregular arrangement. In the illustrated embodiment, the thickness 536b of the diffusion layer 536 is less than 5 micrometers, and the diffusion layer 536 is composed of acrylic resin. It is noted herein that the granular patterns 536a also may be a plurality of granular dents or a combination of a plurality of granular protrusions and a plurality of granular dents according to the requirement of the designer. Furthermore, in the illustrated embodiment, a refractive index of the diffusion layer 536 is different from that of each of the brightness enhancement columns 534a. In another embodiment, the refractive index of the diffusion layer 536 may be identical with that of each of the brightness enhancement columns 534a.

An approach for the formation of the diffusion layer 536 will be described below. Firstly, a diffusion material layer (not shown) is formed on the second surface 532b of the base 532. Next, a patterning process and a curing process are applied to the diffusion material layer so as to form the granular patterns 536a. It is noted that the brightness enhancement layer 534 generally is formed after the formation of the diffusion layer 536.

Figure 7:
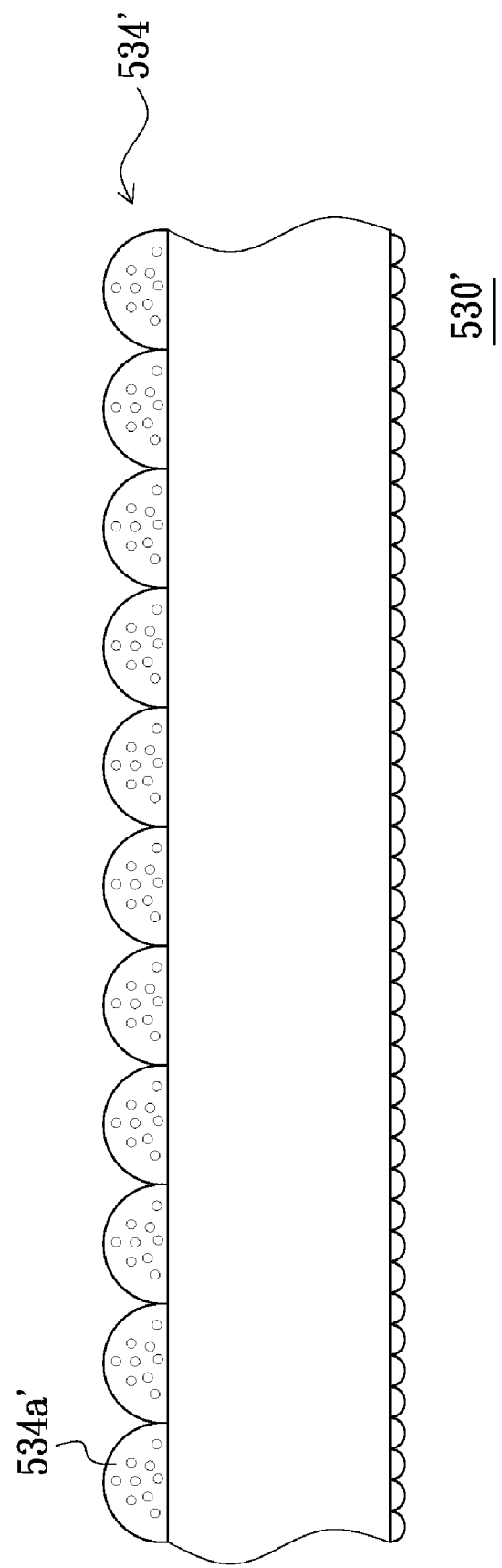
FIG. 7 is a schematic partial enlarged view of another integrated optical film in accordance with the first embodiment of the present invention.

The integrated optical film herein will be given more detailed description. FIG. 7 is a schematic partial enlarged view of another integrated optical film in accordance with the first embodiment of the present invention. Referring to FIGS. 5B and 7, the integrated optical film 530' may replace the integrated optical film 530. The difference between the integrated optical film 530' and the integrated optical film 530 is that each of brightness enhancement columns 534a' of a brightness enhancement layer 534' of the integrated optical film 530' is a cambered column.

The operation of the backlight module 500 will be described below in detail. Referring to FIGS. 5A and 5B, when the light tubes 514 of the light source 510 are activated to emit light beams (not shown), the light beams pass through the diffusion plate 520 and are scattered for the first time. Next, the light beams enter the diffusion layer 536 of the integrated optical film 530 and are scattered for the second time. The light beams leaving the diffusion layer 536 enter the brightness enhancement layer 534 and the light beams leaving the brightness enhancement layer 534 are gathered in some extent. In other words, due to the above-mentioned scattering and gathering processes, the light beams emitted from the light tubes 514 may be uniformed by the diffusion plate 520 and the integrated optical film 530, and the brightness of the backlight module 500 is improved. According to related experimental analysis, the brightness of the backlight module 500 in accordance with the present embodiment is about 9901 cd/m$^2$.

Since the backlight module 500 in accordance with the present embodiment uses the integrated optical film 530, compared with the conventional backlight modules 100, 200 and 300, the brightness of the backlight module 500 in accordance with the present embodiment is relatively high. In addition, since the backlight module 500 in accordance with the present embodiment uses the integrated optical film 530, compared with the conventional backlight modules 400, the amount of elements of the backlight module 500 in accordance with the present embodiment is less. Accordingly, the cost of assembling the backlight module 500 in accordance with the present embodiment is relatively low.

Second Embodiment

Figure 8A:
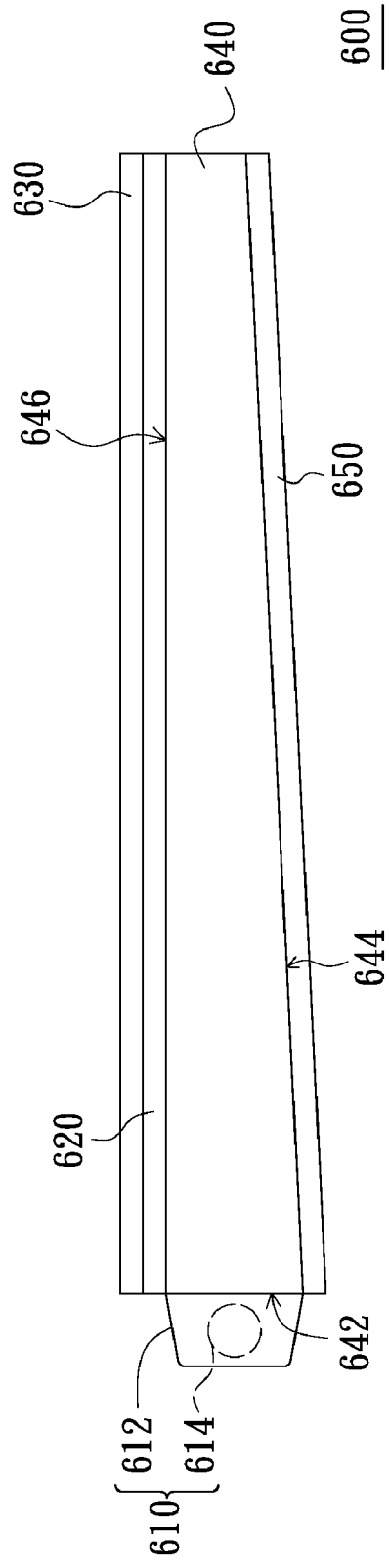
FIG. 8A is a schematic side view of a backlight module in accordance with a second embodiment of the present invention.

FIG. 8A is a schematic side view of a backlight module in accordance with a second embodiment of the present invention. Referring to FIGS. 5A and 8A, the difference between a backlight module 600 and the backlight module 500 is that the backlight module 600 is a side edge type backlight module and the backlight module 500 is a direct type backlight module.

Figure 8B:
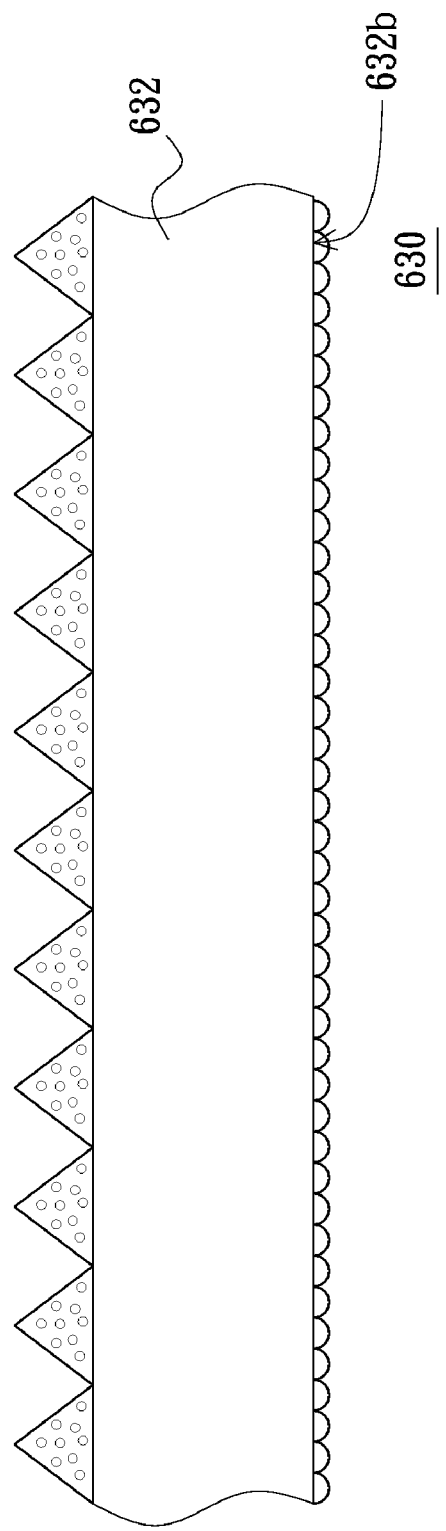
FIG. 8B is a schematic partial enlarged view of the integrated optical film of FIG. 8A.

FIG. 8B is a schematic partial enlarged view of the integrated optical film of FIG. 8A. Referring to FIGS. 8A and 8B, the backlight module 600 in accordance with the present embodiment includes a light source 610, a diffusion film 620, an integrated optical film 630 and a light guiding plate 640. The light guiding plate 640 is, for example, a wedge type light guiding plate. The light guiding plate 640 includes a light incident surface 642, a bottom surface 644 and a light emitting surface 646. The light incident surface 642 connects the bottom surface 644 and the light emitting surface 646. The bottom surface 644 and the light emitting surface 646 are opposite to each other. The light source 610 is disposed adjacent to the light incident surface 642. The light source 610 includes a box 612 and a light tube 614.

The diffusion film 620 is disposed on the light emitting surface 646 of the light guiding plate 640. The integrated optical film 630 is disposed on the diffusion film 620. A second surface 632b of the base 632 of the integrated optical film 630 faces the diffusion film 620 and the light guiding plate 640. Furthermore, the backlight module 600 in accordance with the present embodiment further includes a reflective sheet 650. The reflective sheet 650 is disposed on the bottom surface 644 of the light guiding plate 640. The reflective sheet 650 may reflect light beams entering the light guiding plate 640 toward the light emitting surface 646.

It is indicated herein that, in another embodiment, the light tube 614 may be replaced by a plurality of light emitting diode devices. Furthermore, the light guiding plate 640 may be a flat type light guiding plate instead and the backlight module 600 may further include another light source disposed adjacent to another light incident surface opposite to the light incident surface 642. However, the above mentioned is not shown in any drawing. In addition, the integrated optical film 630 also may be replaced by the integrated optical film 530' as illustrated in FIG. 7.

In summary, the integrated optical films and the backlight modules using the same in accordance with various embodiments of the present invention at least may achieve one of the following advantages or other advantages:

(1) Since each of the backlight modules in accordance with the present embodiments uses the integrated optical film, compared with the prior art, the brightness of each of the backlight modules in accordance with the above-described embodiments is relatively high.

(2) Since each of the backlight modules in accordance with the present embodiments uses the integrated optical film, compared with the prior art, the amount of elements of each of the backlight modules in accordance with the above-described embodiments is less such that the cost of assembling backlight modules in accordance with the above-described embodiments is relatively low.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module comprising:
   a light source;
   a diffusion plate disposed on the light source, wherein the diffusion plate has a light incident surface and a light emitting surface opposite to the light incident surface, and the light incident surface faces the light source; and
   an integrated optical film disposed on the diffusion plate and comprising:
      a base having a first surface and a second surface opposite to each other, wherein the second surface faces the light emitting surface of the diffusion plate;
      a brightness enhancement layer having a plurality of brightness enhancement columns and a plurality of diffusion particles, wherein the brightness enhancement columns are disposed on the first surface and the diffusion particles are dispersed in the brightness enhancement columns; and
      a diffusion layer having a plurality of granular patterns disposed on the second surface in an irregular arrangement.

2. The backlight module as claimed in claim 1, wherein the thickness of the base is in the range from 250 to 350 micrometers.

3. The backlight module as claimed in claim 1, wherein the thickness of the brightness enhancement layer is less than 40 micrometers.

4. The backlight module as claimed in claim 1, wherein the thickness of the diffusion layer is less than 5 micrometers.

5. The backlight module as claimed in claim 1, wherein each of the brightness enhancement columns comprises a prism or a cambered column.

6. The backlight module as claimed in claim 1, wherein the granular patterns comprise a plurality of granular protrusions, a plurality of granular dents or a combination thereof.

7. The backlight module as claimed in claim 1, wherein each of the diffusion particles comprises polymethylmethacrylate, polycarbonate, polystyrene or silicon dioxide.

8. The backlight module as claimed in claim 1, wherein the base comprises polyethylene terephthalate.

9. The backlight module as claimed in claim 1, wherein each of the brightness enhancement columns comprises acrylic resin.

10. The backlight module as claimed in claim 1, wherein the diffusion layer comprises acrylic resin.

11. A backlight module comprising:
    a light guiding plate having a light incident surface, a bottom surface and a light emitting surface, wherein the light incident surface connects the bottom surface and the light emitting surface, and the bottom surface and the light emitting surface are opposite to each other;
    a light source disposed adjacent to the light incident surface;
    a diffusion film disposed on the light emitting surface; and
    an integrated optical film disposed on the diffusion film and comprising:
       a base having a first surface and a second surface opposite to each other, wherein the second surface faces the diffusion film and the light guiding plate;
       a brightness enhancement layer having a plurality of brightness enhancement columns and a plurality of diffusion particles, wherein the brightness enhancement columns are disposed on the first surface and the diffusion particles are dispersed in the brightness enhancement columns; and
       a diffusion layer having a plurality of granular patterns disposed on the second surface in an irregular arrangement.

12. The backlight module as claimed in claim 11, wherein the thickness of the base is in the range from 250 to 350 micrometers.

13. The backlight module as claimed in claim 11, wherein the thickness of the brightness enhancement layer is less than 40 micrometers.

14. The backlight module as claimed in claim 11, wherein the thickness of the diffusion layer is less than 5 micrometers.

15. The backlight module as claimed in claim 11, wherein each of the brightness enhancement columns comprises a prism or a cambered column.

16. The backlight module as claimed in claim 11, wherein the granular patterns comprise a plurality of granular protrusions, a plurality of granular dents or a combination thereof.

* * * * *